United States Patent [19]

McArdle

[11] Patent Number: 5,514,412
[45] Date of Patent: May 7, 1996

[54] METHOD OF STABILIZING SOIL, BEACHES AND ROADS

[76] Inventor: Blaise McArdle, R.R. 2, Mount Vernon, Me. 04352

[21] Appl. No.: 523,163

[22] Filed: Sep. 5, 1995

[51] Int. Cl.⁶ .................................................. B05D 5/00
[52] U.S. Cl. ........................... 427/136; 427/215; 427/384
[58] Field of Search ........................... 427/136, 384, 427/215

[56] References Cited

U.S. PATENT DOCUMENTS

| | | |
|---|---|---|
| 3,696,621 | 10/1972 | Simms et al. .................. 166/36 R |
| 3,763,072 | 10/1973 | Krieger . |
| 3,876,576 | 4/1975 | Michalski . |
| 3,900,611 | 8/1975 | Corbett et al. ................... 427/214 |
| 3,939,662 | 2/1976 | Volz ................................. 427/136 |
| 5,395,646 | 3/1975 | Basseres .......................... 427/136 |

*Primary Examiner*—Janyce Bell

[57] ABSTRACT

This invention relates to a process and compositions for conditioning soils, beaches and roadways by treating the surface or the roadway construction materials of these areas with a granular composition or an aqueous solution containing a protein-polysaccharide complex. The treated surfaces and roadway materials have improved erosion resistance.

30 Claims, No Drawings

METHOD OF STABILIZING SOIL, BEACHES AND ROADS

FIELD OF THE INVENTION

This invention relates to the treatment of ground surfaces such as soil, beaches, loose gravel, road surfaces and road beds and the treatment of road construction materials to improve their resistance against erosion caused by environmental forces and physical wear.

BACKGROUND OF THE INVENTION

Erosion of soils, beaches and paved and unpaved road surfaces is caused by environmental conditions such as wind, rain, water flow, temperature change such as freeze-thaw cycle and physical traffic.

Erosion has been combatted on soil surfaces by planting vegetation that binds the upper layer of the soil. Such plantings are not suitable on land subject to erosion if the land is to be subsequently used for agricultural purposes. Also, a wide variety of chemical combinations have been used to treat soils in order to prevent erosion from wind and water to control fugitive dust. Many of the previously applied stabilization chemicals may produce deleterious long term effects upon the soil surface or on the surrounding watershed.

Beach erosion due to storm damage, tidal effects, rain and wind remains a constant plague to seaside communities and beach front property owners. There is currently no known effective beach surface treatment to substantially reduce the occurrence of beach erosion, rather beaches simply erode and are then rebuilt by expensive sand refurbishing.

Rural road surfaces are typically formed by scraping and depositing of a layer of gravel or a bituminous or cementitious coating. Such road surfaces being constantly subjected to severe environmental conditions and traffic suffer erosion in the form of potholes, ruts, washboarding, and cracking.

Particles of dust and dirt arise from gravel during its formation from larger stone pieces as well as during subsequent deposition and usage on road surfaces. Typically dusty soils have been stabilized with aqueous solutions of polymers sometimes containing wetting agents such as in U.S. Pat. Nos. 4,592,931; 3,900,611; 3,876,576; 3,763,072; and 3,696,621.

It is an object of the present invention to provide an inexpensive composition and simple and reliable method to stabilize dusty ground surfaces against erosion.

Another object of the present invention is to provide a composition and method to control dust from gravel and stone during comminution and subsequent deposition on ground surfaces and roadways.

A further object is to provide a stabilizing composition and method to impregnate asphalt and cementitious compositions to improve the resistance of the subsequently formed surface coatings against erosion.

Other objects and many of the attendant advantages of this invention will be readily appreciated upon review of the following detailed description.

SUMMARY OF THE INVENTION

The present invention is directed to a process for treating ground surfaces such as soil, beaches, loose gravel and road surfaces with a binding composition containing a protein-polysaccharide complex to reduce or substantially prevent erosion. The protein-polysaccharide complex can be applied to ground surfaces as a dry granular mixture or in solution and can be mixed with a variety of adjuvants. The protein-polysaccharide complex can be mixed into asphalt and cement compositions during manufacture.

DETAILED DESCRIPTION OF THE INVENTION

It has been found that dust can be controlled and ground surfaces such as soil, beaches and road surfaces can be stabilized against erosion by water, snow and wind by treating these ground surfaces with a binding composition containing a protein-polysaccharide complex. The soil surface to be treated may be tilled or untilled and may contain plants or vegetation. The stabilization method of the present application is particularly effective on unpaved dirt and gravel road surfaces in curtailing dust formation and preventing or reducing erosion, rutting, the formation of potholes and washboarding. Washboarding is the effect created on hard packed dirt and gravel roads in which the road surfaces become uneven similar to the face of a washboard.

The method of the present invention is useful in reducing erosion of beaches caused by rainfall, wind and tidal water flows including severe environmental conditions experienced during hurricanes by impregnating the beach surface with the protein-polysaccharide complex preferably in the form of a solution.

The method of the present invention is also applicable to the treatment of asphalt and concrete road surfaces with the protein-polysaccharide complex to aid in the prevention or reduction of erosion of such surfaces by curtailing cracking and the formation of potholes in such paved road surfaces. The protein-polysaccharide complex can be coated onto the road surface or admixed with the asphalt and concrete during preparation of the asphalt and cement.

The protein-polysaccharide complex is also useful, in curtailing and suppressing dust formation. As a coating treatment on loose gravel and earthen surfaces such as roads.

The protein-polysaccharide complex (PPC) composition used as a stabilization compound in the present invention includes a water-soluble polysaccharide and a substantially water-insoluble protein. The protein-polysaccharide complex composition can be formed in granular form or as a solution.

The preferred polysaccharides for use in the present stabilization composition are substantially water-soluble and are preferably generally recognized as safe (G.R.A.S.) by the U.S. Food and Drug Administration. In general, the preferred water-soluble polysaccharides are plant-derived polysaccharides and related materials such as pectin.

Examples of polysaccharides that can be used to prepare the PPC composition include, but are not limited to water-soluble cellulose derivatives, seaweed polysaccharides such as alginate and carrageenin, seed mucilaginous polysaccharides, complex plant exudate polysaccharides such as gum arabic, tragacanth, guar gum, pectin, ghatti and the like, and microbially synthesized polysaccharides such as xanthan gum. In a preferred embodiment, the polysaccharides are guar gum, pectin, gum arabic and mixtures thereof.

The polysaccharide is present in the PPC composition in an amount ranging between about 90% to 99.5% by weight of the combined polysaccharide and protein components in the PPC composition, preferably in an amount ranging between about 95% to 99% by weight of the combined polysaccharide and protein components of the PPC composition.

Similarly, proteins useful in the stabilizing PPC composition can be any protein that is predominately or substantially water-insoluble, however, vegetable proteins or prolamines are advantageously preferable due to their availability. Prolamine is a cereal-derived protein that is insoluble in water, absolute alcohol or neutral solvents and soluble in dilute (80%) alcohol. Examples of suitable prolamines for use in the present invention include, but are not limited to, corn-derived prolamine or zein, barley-derived prolamine or hordein, and wheat-derived prolamine or giladin.

In a preferred embodiment of the invention, the vegetable protein or prolamine used in the composition is zein or corn gluten. Zein is extracted from corn or maize. PPC compositions containing zein are used to form odorless, clear, hard and almost invisible films. Sixteen amino acids have been isolated from zein including glutamic acid or glutamine, leucine, proline, alanine, phenylalanine, isoleucine, serine, tyrosine and asparagine. The remaining seven amino acids are present in amounts of less than 3% by weight.

Zein is commonly extracted from corn gluten by physical separation means as opposed to chemical separation means. Whole corn zein contains a heterogeneous mixture of disulfide linked aggregates. Commercial extraction of zein generally results in a product with a molecular weight of about 25,000 to 35,000. Zein contains a high proportion of hydrocarbon group side chains and has a high percentage of amide groups present with a relatively low amount of free carboxylic acid groups.

The substantially water-insoluble protein is present in the PPC composition in an amount ranging between about 0.5% to 10% by weight of the combined polysaccharide and protein components of the PPC composition, preferably in an amount ranging between about 1% to 5% by weight.

Relatively small amounts of a pH adjusting compound in the form of an acid or an acidulant are preferably used to lower the pH of the aqueous polysaccharide solutions during preparation of the PPC compositions to between 1 to 11.5, preferably about 3.8 to 8.5. The acidulants enhance the water dispersibility of the PPC compositions, thereby facilitating reconstitution of the protein-polysaccharide complex compositions in water. Although any pH adjusting acidic compound is useful in the present invention, including inorganic acids such as carbonic acid, sulfuric acid, hydrochloride acid and the like, it is preferable to utilize organic acids, preferably $C_1$ to $C_{20}$ organic acids. Suitable organic acidulants include, but are not limited to, citric acid, malic acid, adipic acid, tannic acid, lactic acid, ascorbic acid, acetic acid, fumaric acid and the like and mixtures thereof. In a preferred embodiment, citric acid is used.

The acids are preferably used in an amount between about 0.25% to 5% by weight of the combined weight of polysaccharide and protein components of the PPC compositions, preferably in an amount between about 0.5% to 1% by weight. The acid is preferably added to the water of an aqueous organic solvent system prior to addition of the protein and polysaccharide organic component.

PPC compositions are preferably prepared by dissolving a water-insoluble protein or prolamine in an aqueous organic solvent system containing the pH adjusting acidic component to form a protein solution. A soluble polysaccharide is then added to the protein solution to form a protein-polysaccharide complex in solution. If desired, the solvent is then separated or evaporated from the solution to yield the final protein polysaccharide complex composition.

The aqueous organic solvent system is a mixture containing at least one organic solvent in water. Suitable organic solvents include, but are not limited to, alcohols such as ethyl alcohol and isopropyl alcohol; glycols such as propylene glycol and polyethylene glycols; and, ketones such as acetone. In a preferred embodiment of the invention, the aqueous organic solvent system is either aqueous ethyl alcohol or aqueous isopropyl alcohol. Alcohols generally can hold up to six grams of zein in solution for each 100 milliliters of alcohol.

The desired ratio of water to organic solvent in the aqueous organic solvent system is dependent on factors such as the miscibility of the solvent in the water and the amount of protein to be dissolved. When the organic solvent system is aqueous ethyl alcohol or aqueous isopropyl alcohol, the amount of water generally ranges between about 10% to 40% by weight and the amount of alcohol generally ranges between about 60% to 90% by weight. More preferably, the amount of water in such systems is between about 25% to 35% and the amount of alcohol is between about 65% to 75%.

The substantially water-insoluble protein or prolamine is added to the aqueous organic solvent system in an amount between about 100 and 300 grams of prolamine per liter of aqueous organic solvent system, more preferably in an amount between about 120 to 240 grams per liter. The dissolution is carried out at a temperature between about 20° C. (ambient room temperature) and about 60° C., preferably about 30° C. using conventional agitation methods to form a protein solution. Soluble polysaccharide in minute fiber or particulate form is then admixed with the protein solution to form a PPC in solution.

In an alternative embodiment, a protein containing gluten such as corn gluten can be directly added into the aqueous organic solvent system instead of pure zein. In this preparation procedure, the zein protein portion of the gluten passes into solution while the deprotenated non-zein remainder of the gluten can be separated by vacuum filtering or other standard separation techniques. An incidental amount of up to 100% by weight of expended or deprotenated gluten can be present in the recovered admixture with the protein-polysaccharide complex without adversely affecting the properties of the PPC, however it is preferable to employ amounts up to 10% by weight of the gluten.

The protein-polysaccharide portion of a PPC in solution generally contains between about 90% to 99.5% by weight of polysaccharide, between about 0.5% to 10% of a protein. The PPC solution preferably additionally, contains between about 0.25 to 5% by weight of a pH adjusting component based upon the total weight of protein and polysaccharide. More preferably, the PPC solution contains between about 95% to 99% of polysaccharide and between about 1% to 5% of vegetable protein based on the total weight of polysaccharide and protein.

It is important that the substantially water-insoluble protein or prolamine thoroughly impregnate the soluble polysaccharide particles during the process of admixing the soluble polysaccharide with the protein solution. The aqueous organic solvent system used to prepare the protein solution should wet the soluble polysaccharide particles so that the hydrophilic soluble polysaccharide particles are impregnated or coated with the hydrophobic protein to form the PPC in solution.

The mixing process to prepare PPC in solution is carried out until a complete uniform mixture is attained. In general, the process is carried out at a temperature between about 20°

C. and 60° C., preferably between about 20° C. and 25° C. for a time period of between about 10 and about 30 minutes, preferably between about 10 and 15 minutes. The PPC in solution is agitated during the mixing process by conventional agitation methods including, but not limited to, manual shaking, mechanical shaking, magnetic stirring, mechanical stirring or a combination thereof.

Additives that promote impregnation may be added at any point during the admixing process. Suitable additives include, but are not limited to, detergents and emulsifiers. Exemplary additives are polysorbates, oils and albumin. Additives may be used in an amount between about 0.25% to 5.0% by volume of the PPC in solution, preferably between about 0.5% to 1.0%.

Once the PPC in solution has been prepared, the solvent is optionally separated or evaporated to yield a protein-polysaccharide complex composition, that is, a particulate polysaccharide impregnated or complexed with a protein. Any number of solvent removal techniques may be used including, but not limited to, vacuum drying, centrifugation, evaporation, freeze drying, air drying, convection oven drying or a combination thereof. One preferred method of extracting the solvent is vacuum drying which safety removes and recovers the solvent while drying the product to provide the PPC composition. The protein-polysaccharide complex composition provided in accordance with the invention can be further processed by grinding or milling to a desired mesh particle size for use as a powder and the like.

In another embodiment, the PPC in solution can be mixed directly into water for application onto ground surfaces. The PPC solution can be diluted with water for administration onto ground surfaces and comminuted rock or loose gravel. Alternatively, the particulate or powdered protein-polysaccharide complex can be admixed with water for application onto ground surfaces or comminuted rock. Typically an aqueous solution of PPC contains 0.1 to 50 grams of PPC per liter of water.

In the method according to the present invention, the soil, beach area, ground surface or road surface is treated with powdered or granular PPC composition or an aqueous solution of a PPC composition. The dispersibility and the film forming characteristics of the PPC composition can be modified by adding up to 5%, preferably 0.125% to 5%, by weight of particulate metal oxides or sulfides containing metals from Periodic Table Groups 4 to 13, preferably Groups 8 to 10, most preferably any valent form of iron oxide and iron sulfide. These metal oxides or sulfides can be added to the initial solvent system to admix with the PPC composition during formation or be subsequently added to and mixed with the dry powdered PPC composition. The solution or powder applied to the ground surfaces may additionally contain one or more additives at a total level of up to 20% by weight of the combined polysaccharide and protein components of the PPC composition including fillers, pigments, stabilizers, thickening agents, buffers, fertilizers, mineral salts and plant protection agents. Particularly useful fillers include waxes, paraffins, resin, lignin stabilizers, $SiO_2$, drilling muds and borax (sodium borate). Borax is preferably added only to a dry mixture of a PPC composition. Borax can be separately applied as a post-treatment onto a ground surface after the ground surface has been treated with a PPC composition, preferably as an aqueous composition containing borax in amounts ranging from 1% to 5% by weight.

The surface treating PPC composition of the present invention can be used to coat comminuted rock, such as crushed stone or gravel, to suppress dust. The protein-polysaccharide complex coating composition can be applied to the surface of the crushed stone or gravel during the pulverization or the crushing procedure to reduce the emission of dust during comminution of the larger stone pieces. The protein-polysaccharide complex coating composition in solution can be sprayed onto the surface of the gravel or crushed stone or after the deposition of the gravel or crushed stone on a ground surface such as a road bed, driveway or parking lot. The PPC composition is applied at a rate of 5 to 200 grams of PPC composition per 100 $ft^2$ of stone surface to be coated.

The ground surfaces can be stabilized against erosion by treating the ground surface with 1 to 6000 grams of PPC composition per 100 $ft^2$ of ground surface area, preferably 5 to 20 grams of PPC composition per 100 $ft^2$ of soil or road ground surface area and 2000 to 6000 grams, most preferably 2000 to 4000 grams of PPC composition per 100 $ft^2$ of beach or sandy ground surface area. Beach areas to be stabilized against erosion require higher end application rates due to the porosity of the sand and to provide stabilization of the sand against destructive wave action. As previously discussed, the PPC composition can be applied in solution by spraying or in granular form by spreading means such as a broadcast spreader or the like.

In an alternative embodiment, the PPC composition can be added in granular form or in solution directly to cementitious or asphalt compositions in amounts of protein-polysaccharide complex (PPC) ranging from 0.0002 to 1%, preferably 0.0001 to 0.1% by weight of the total cementitious or asphalt composition. The addition of this PPC additive to cement or asphalt improves tensile strength and internal adhesion properties of cement or asphalt. The incorporation of a PPC composition into cement and asphalt increases the elasticity and longevity of the subsequently formed cement or asphalt product or cementitious or asphalt paving coating, thereby reducing the likelihood of the product or coating to crack. Granular PPC composition is preferably added to the dry cement or asphalt during formation.

The use of PPC additives to asphalt compositions during asphalt fabrication processes promotes increased internal adhesion between the asphalt wrap and the virgin aggregate such as comminuted stone, resulting in an asphalt product having improved road surface characteristics. Reduced amounts of asphalt wrap can be used to produce asphalt compositions containing PPC as an additive since the PPC additive promotes adhesion and coating of the asphalt wrap onto the virgin aggregate.

It is believed that the composition used according to the present invention forms a protective binding layer on the ground surface by hydrogen bonding with silica and silicates present in the soil or road surface.

The invention is illustrated by the following examples in which parts and percentages are expressed by weight unless otherwise stated.

EXAMPLE A

A 10% zein solution was prepared by dissolving 10 grams of zein in 90 grams of an aqueous isopropyl alcohol solution. The aqueous isopropyl alcohol solution contained 15% water by weight and 85% isopropyl alcohol by weight. Dissolution was carried out in a 500ml beaker and the solution was initially stirred using a mechanical stirrer at a speed of over 100rpm in order to fully wet the zein. Once all of the zein was dispersed, the stirring speed was reduced by about ½ for an additional five minutes to insure complete dissolution of the zein in the aqueous isopropyl alcohol solution and to produce protein solution. The ambient temperature was maintained at 22° C. throughout this procedure.

Two hundred grams (200g) of milled guar gum powder (fine60 mesh, TIC GUMS, Belcamp, Md.) was slowly added to the protein solution with vigorous stirring using a mechanical stirrer at a speed of over 100rpm. Manual stirring was started as the mixture thickened. Additional aqueous isopropyl alcohol was added to attain a soupy appearance indicative of successful impregnation of the soluble guar gum particles by the zein solution. Agitation of this soupy liquid mixture was maintained for fifteen minutes.

The resulting PPC solution was dried under reduced pressure of 0.05 atmospheres at a temperature of 60° C. using a lab-line Duo-Vac vacuum oven manufactured by LabLine Corp., Melrose Park, Ill. The resulting recovered dried PPC composition was a yellowish-beige color and was milled to a granular form (80 mesh).

EXAMPLE B

The procedure of Example A was followed, however 1.5 grams of iron oxide (FeO) (Harcros high moment iron oxide TB5600-lot F4122, Easton, Pa.) was mixed per each 10 grams of zein contemporaneously with the addition of the guar gum. The iron oxide/PPC mixture was not recovered from the solution but 4405.3 ml containing approximately 2516.5 grams of PPC was directly mixed into a 250 gallon gravity spray applicator filled with water.

EXAMPLE C

Dry granular PPC as prepared in accordance with the procedure of Example A additionally containing 10% by weight of expended corn gluten was mixed with 0.5% by weight of iron oxide for dispersal in a hand held fertilizer applicator. The dry granular PPC was also premixed with 2% by weight of borax.

EXAMPLE D

The granular PPC prepared in accordance with the procedure of Example A was dispersed in water at a rate of 10 grams of PPC to 4000 ml of water for application through a gravity sprayer.

EXAMPLE 1

Each of the three PPC compositions as prepared in Examples B, C and D were applied to a 20,000. ft$^2$ surface of a dirt road in Rome, Me. at the following application rates:

| PPC Composition | Application Rate (grams PPC/ft$^2$) |
|---|---|
| Example B | .125825 grams per/ft$^2$ |
| Example C | .125825 grams per/ft$^2$ |
| Example D | .125825 grams per/ft$^2$ |

Road surfaces treated with the PPC composition using the compositions of Examples B and D were after-treated with 4000 ml of a 2% by weight aqueous borax solution per 100 ft$^2$ of ground surface.

The dirt roads were evaluated for erosion over a sixteen month period. During the evaluation period the dirt road surface was graded six separate occasions, plowed of snow regularly during the winter months and salted with salt coated with $SiO_2$ as a flowing agent after snowfalls.

During rainfalls the water on the surface of the treated dirt road was quickly absorbed until saturated and the remaining water flowed onto both sides of the road. Contiguous areas of untreated dirt road displayed massive erosion and washboarding even after the surface of the road had been graded and compacted with a roller.

During the winter months each section of the PPC treated road surfaces took longer to freeze than the untreated dirt road sections and maintained a constant temperature after the road had frozen.

During periods of dryness dust arising from the road surface from the PPC treated surfaces was substantially reduced compared to contiguous untreated dirt road surfaces.

EXAMPLE 2

Each of the three PPC compositions as prepared in Examples B, C and D were applied to a 2,000 ft$^2$ surface of a dirt road under swampy conditions at the following application rates:

| PPC Composition | Application Rate (grams PPC/ft$^2$) |
|---|---|
| Example B | .125825 grams per/ft$^2$ |
| Example C | .125825 grams per/ft$^2$ |
| Example D | .125825 grams per/ft$^2$ |

Road surfaces treated with the PPC composition using the compositions of Examples B and D were after-treated with 2% by weight of an aqueous borax solution per 4000 ml of PPC in solution.

After three days the road surface reached its water equilibrium and the road surface stabilized and became passable.

One 2,000 ft$^2$ area of swampy road surface was treated with the PPC composition of Example C additionally containing 50 grams of borax per 252 grams of PPC. This treated road surface became firm within 24 hours, resisted water overflowing the road and did not erode.

EXAMPLE 3

Each of the three PPC compositions as prepared in Examples B, C and D were applied to 10,000 ft$^2$ of a dirt service road stretching along a mixed paved road of asphalt that passed over base concrete culverts. The PPC compositions were applied at the following application rates:

| PPC Composition | Application Rate (grams PPC/ft$^2$) |
|---|---|
| Example B | .125825 grams per/ft$^2$ |
| Example C | .125825 grams per/ft$^2$ |
| Example D | .125825 grams per/ft$^2$ |

Road surfaces treated with the PPC composition using the compositions of Examples B and D were after-treated with 2% by weight of an aqueous borax solution per 4000 ml of PPC in solution.

After periodic rainfall and over a 120 day period not noticeable erosion occurred on the service road surface. Furthermore, the PPC compositions had spread over the concrete and the asphalt coated surfaces. Substantially no cracking or pot-holing of these coated surfaces were noted over a 12 month period. Contiguous non-PPC treated surfaces displayed substantially higher degrees of cracking and pot-holing.

EXAMPLE 4

The PPC composition of Example D was spayed on a road surface abutting a cornfield at an application rate 1400 grams of PPC at a concentration of 10 grams of PPC per 4000 ml. Road surfaces treated with the PPC composition using the compositions of Examples B and D were after-treated with 2% by weight of an aqueous borax solution per 4000 ml of PPC in solution. Six hours after application it began to rain and it rained daily for seven consecutive days. The PPC composition had in port washed from the roadway and onto the soil surface abutting the treated roadway. The road surface was firm and showed no signs of erosion two days after the rain ceased. The soil surfaces abutting the road surface were extremely swampy and unplowable along non-PPC treated road surfaces, however, the soil areas abutting the PPC treated road surface were firm to the extent that the soil could be plowed.

EXAMPLE 5

The PPC composition of Example B was applied onto a 50 ft$^2$ area of beach at a concentration of 30 grams of PPC per 4000 ml of water at an application rate of 1 gallon per ft$^2$. The beach and adjacent beach located at Long Boat Key in Florida was subsequently subjected to hurricane conditions and substantial beach erosion washed away the adjacent beach surface, however, the PPC treated sand surface remained substantially intact after the storm.

What is claimed is:

1. A method of stabilizing soil, beaches and road surfaces and preventing erosion by treating the surfaces with a protein-polysaccharide complex composition comprising:
   between about 90% to 99.5% by weight of a water-soluble polysaccharide impregnated with between about 10% to 0.5% by weight of a substantially water-insoluble protein.

2. The method of claim 1 wherein the water-soluble polysaccharide is selected from the group consisting of alginate, carrageenin, gum arabic, tragacanth, guar gum, pectin, ghatti, xanthan gum and mixtures thereof.

3. The method of claim 1 wherein the substantially water-insoluble protein is a prolamine.

4. The method of claim 1 wherein the substantially water-insoluble protein is zein.

5. The method of claim 1 wherein the composition further includes at least one additive for promoting impregnation of the water-soluble polysaccharide by the protein.

6. The method of claim 1 wherein the substantially water-insoluble protein is hordein or giladin.

7. The method of claim 1 wherein the surfaces are stabilized by treating the surfaces with a protein-polysaccharide complex composition in a particulate form.

8. The method of claim 1 wherein the water-soluble polysaccharide comprises guar gum and the substantially water-insoluble protein comprises zein.

9. The method of claim 1 further comprising:
   between about 0.25% to 5% by weight of an acidulant.

10. The method of claim 9 wherein the acidulant is selected from the group consisting of tannic acid, lactic acid, ascorbic acid, acetic acid, citric acid, malic acid, adipic acid, fumaric acid and mixtures thereof.

11. The method of claim 9 wherein the acidulant is citric acid.

12. The method of claim 1 wherein the protein-polysaccharide composition further comprises 0.125 to 5% by weight of a metal oxide filler calculated on the weight of protein-polysaccharide complex.

13. The method of claim 12 wherein the metal oxide filler is iron oxide.

14. The method of claim 1 wherein the protein-polysaccharide composition further comprises up to 20% by weight of borax.

15. The method of claim 1 wherein the protein-polysaccharide composition further comprises up to 10% by weight of expanded corn gluten.

16. The method of claim 1 wherein the soil, beach and road surfaces are treated with 1 to 6000 grams of protein-polysaccharide complex per 100 ft$^2$ surface area.

17. The method of claim 1 wherein beach surfaces are treated with 2000 to 6000 grams of protein-polysaccharide complex per 100 ft$^2$ of surface area.

18. The method of claim 1 wherein soil and road surfaces are treated with 5 to 20 grams of protein-polysaccharide complex per 100 ft$^2$ of surface area.

19. A method of suppressing dust emanating from comminuted stone by treating the comminuted stone with a solution comprising a protein-polysaccharide complex composition comprising: between about 90% to 99.5% by weight of a water-soluble polysaccharide impregnated with between about 10% to 0.5% by weight of a substantially water-insoluble protein.

20. The method of claim 19 wherein the water-soluble polysaccharide is selected from the group consisting of alginate, carrageenin, gum arabic, tragacanth, guar gum, pectin, ghatti, xanthan gum and mixtures thereof.

21. The method of claim 19 wherein the substantially water-insoluble protein is a prolamine.

22. The method of claim 19 wherein the substantially insoluble protein is zein.

23. The method of claim 19 wherein the composition further includes at least one additive for promoting impregnation of the soluble polysaccharide by the protein.

24. The method of claim 19 wherein the substantially water-insoluble protein is hordein or giladin.

25. The method of claim 19 wherein the water-soluble polysaccharide comprises guar gum and the substantially water-insoluble protein comprises zein.

26. The method of claim 19 further comprising: between about 0.25% to 5% by weight of an acidulant.

27. The method of claim 19 wherein the acidulant is selected from the group consisting of tannic acid, lactic acid, ascorbic acid, acetic acid, citric acid, malic acid, adipic acid, fumaric acid and mixtures thereof.

28. The method of claim 19 wherein the protein-polysaccharide composition further comprises 0.125 to 5% by weight of a metal oxide filler calculated on the weight of protein-polysaccharide complex.

29. The method of claim 28 wherein the metal oxide filler is iron oxide.

30. The method of claim 19 wherein the comminuted stone is treated with 5 to 2000 grams of protein-polysaccharide complex per 100 ft$^2$ of stone surface to be treated.

* * * * *